N. HEADLAND.
MACHINE FOR PASTING, TRIMMING, AND FOLDING WALL PAPER.
APPLICATION FILED JAN. 16, 1917.
1,303,895.
Patented May 20, 1919.
9 SHEETS—SHEET 1.
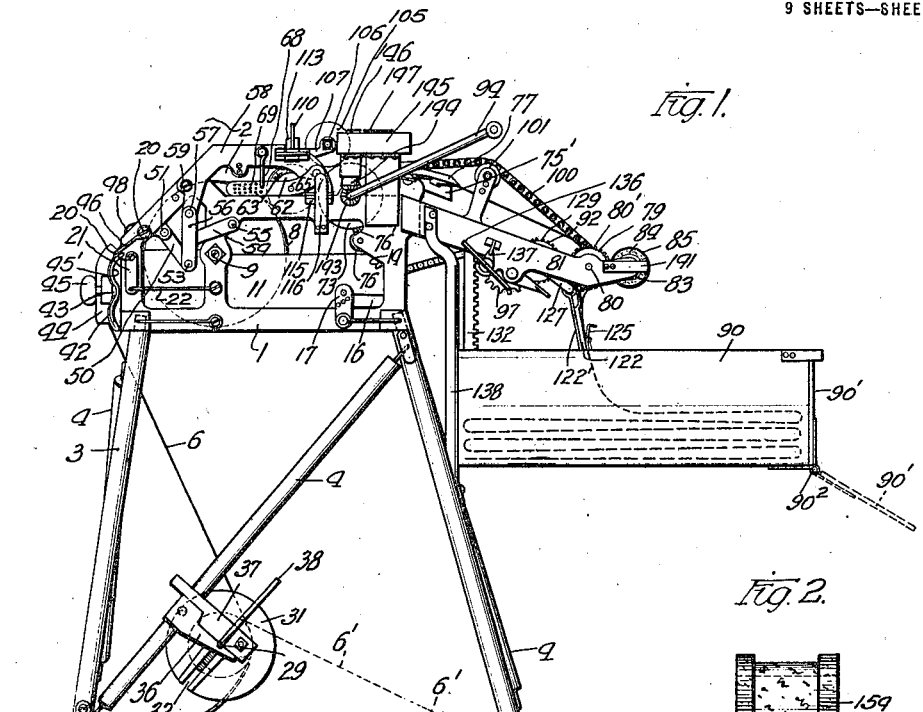
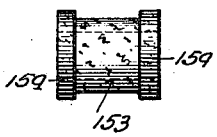
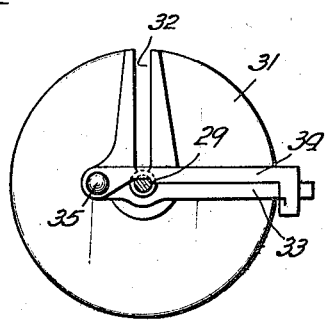
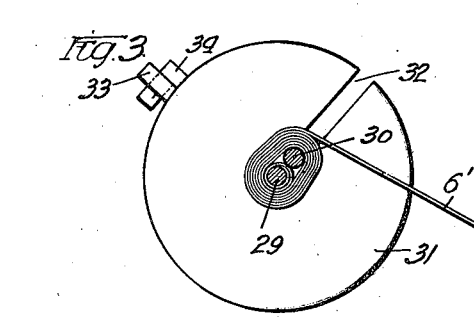
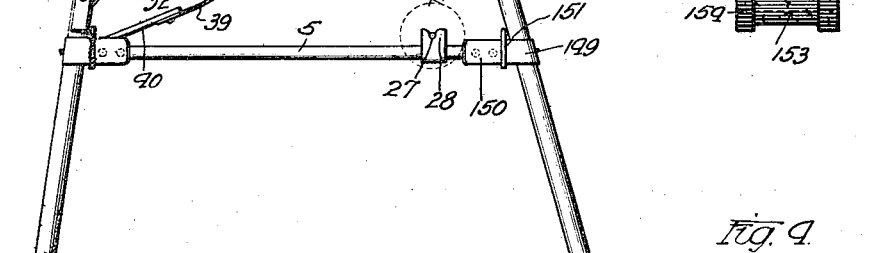
Witnesses:
Arthur W. Carlson
Robert F. Twin
Inventor
Nestor Headland
By his attorneys N. HEADLAND.
MACHINE FOR PASTING, TRIMMING, AND FOLDING WALL PAPER.
APPLICATION FILED JAN. 16, 1917.

1,303,895.

Patented May 20, 1919.
9 SHEETS—SHEET 2.

Witnesses:
Arthur W. Carberry
Robert H. Weir

Inventor
Nestor Headland,
By Hill & Hill
Attys

N. HEADLAND.
MACHINE FOR PASTING, TRIMMING, AND FOLDING WALL PAPER.
APPLICATION FILED JAN. 16, 1917.

1,303,895.

Patented May 20, 1919.
9 SHEETS—SHEET 3.

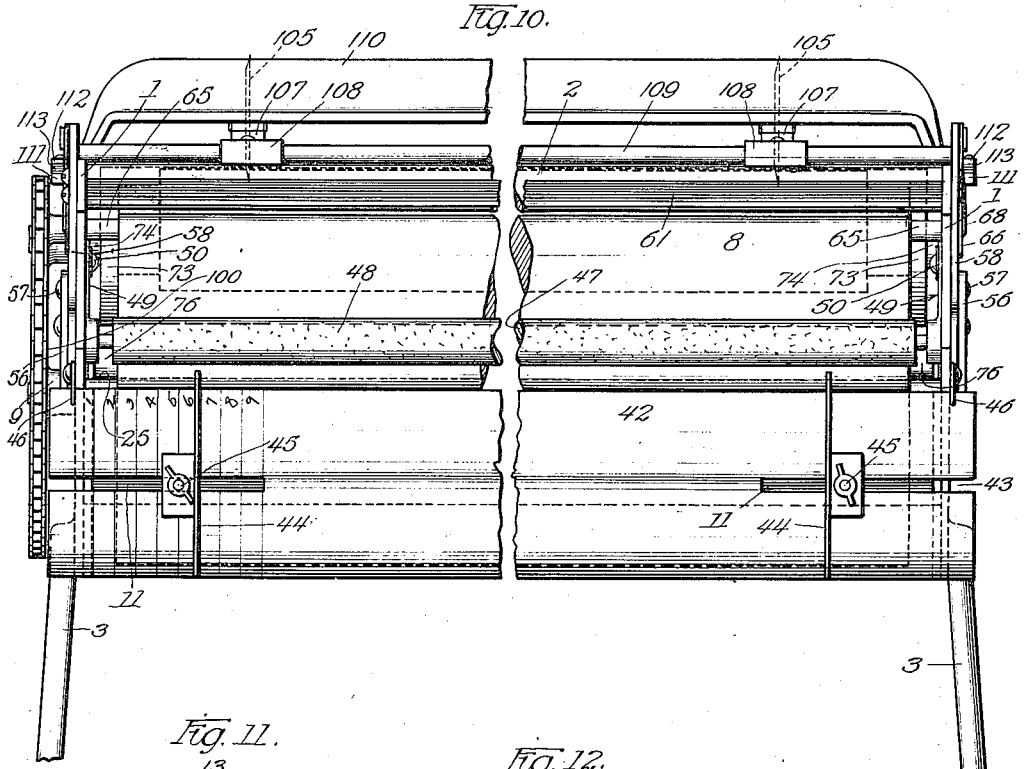
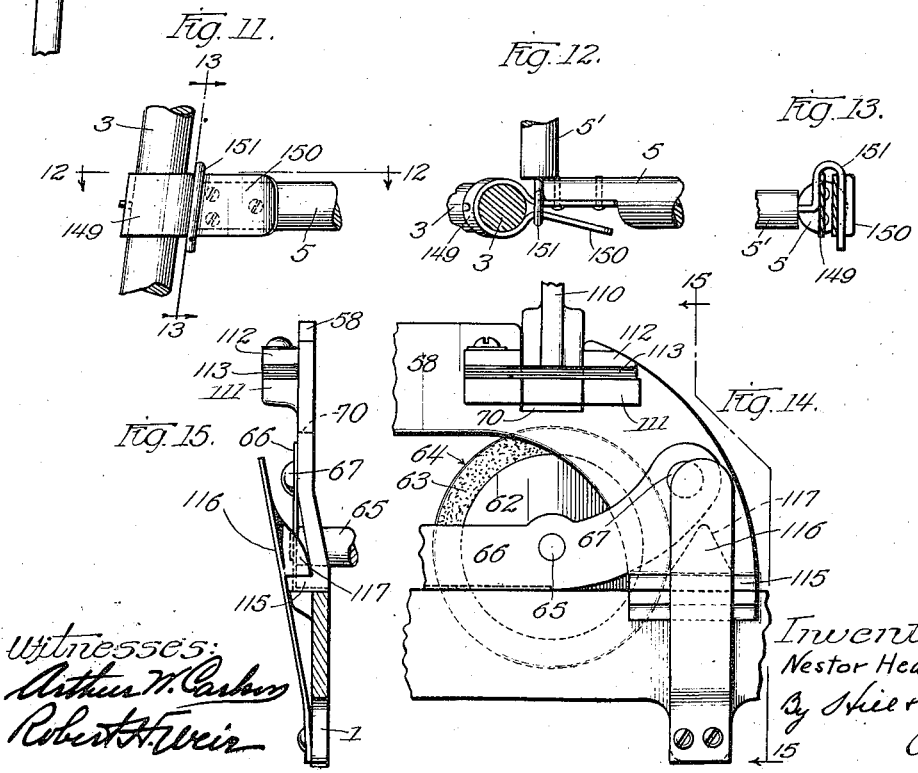

N. HEADLAND.
MACHINE FOR PASTING, TRIMMING, AND FOLDING WALL PAPER.
APPLICATION FILED JAN. 16, 1917.
1,303,895.  Patented May 20, 1919.
9 SHEETS—SHEET 7.
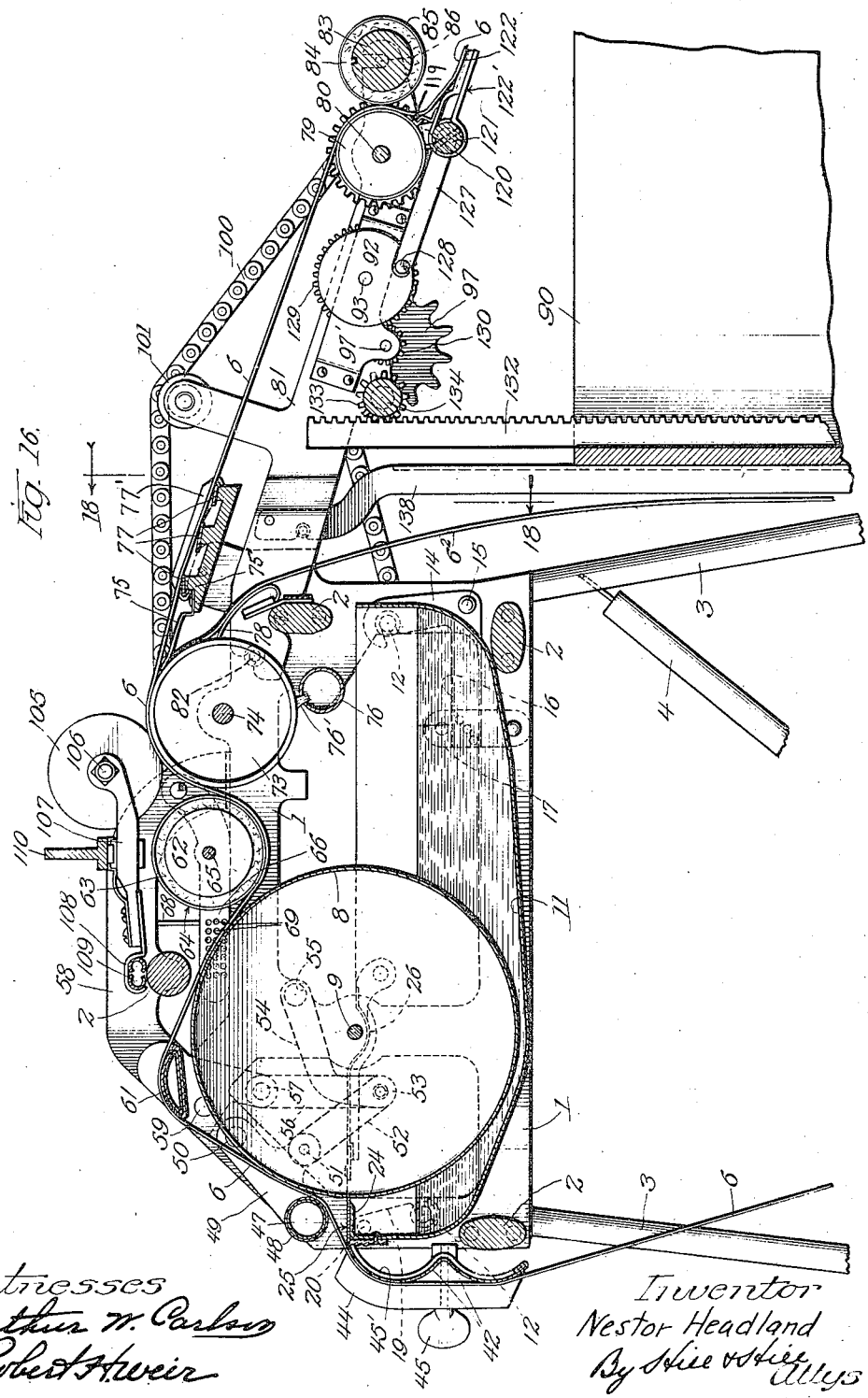

N. HEADLAND.
MACHINE FOR PASTING, TRIMMING, AND FOLDING WALL PAPER.
APPLICATION FILED JAN. 16, 1917.
1,303,895.
Patented May 20, 1919.
9 SHEETS—SHEET 8.
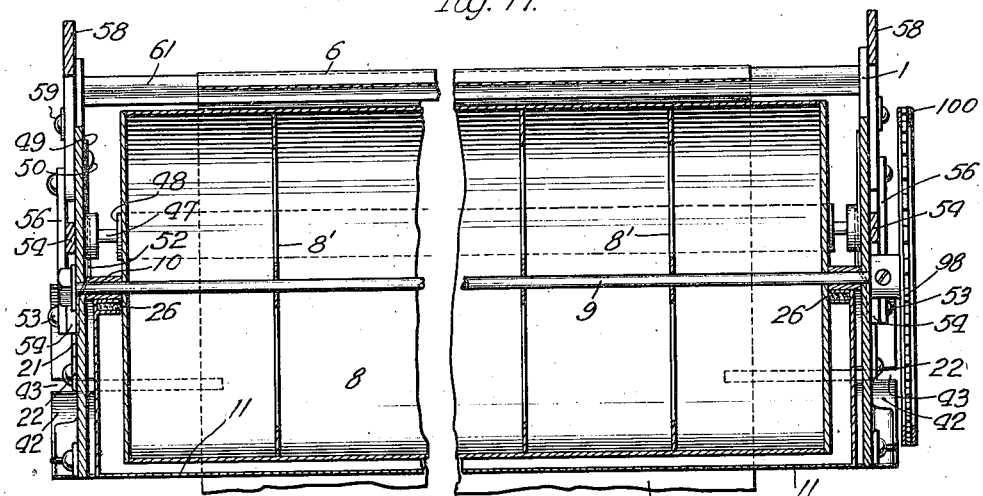
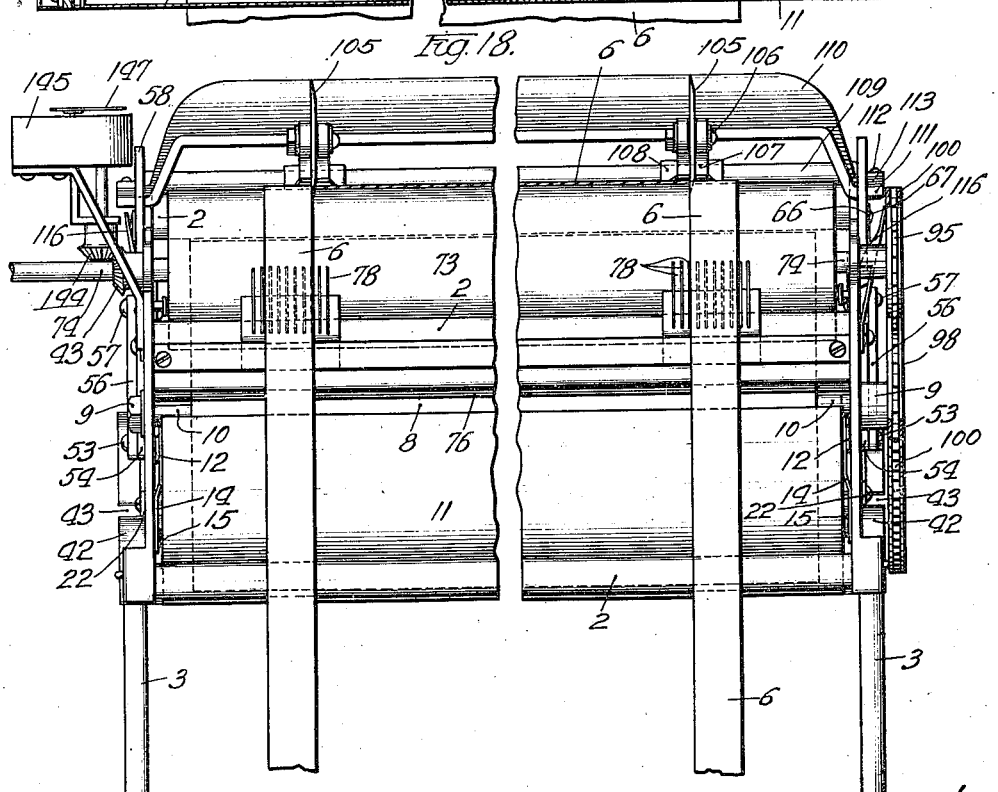
Witnesses:
Arthur W. Carlson
Robert H. Weir
Inventor
Nestor Headland
By Shepherd Attys N. HEADLAND.
MACHINE FOR PASTING, TRIMMING, AND FOLDING WALL PAPER.
APPLICATION FILED JAN. 16, 1917.

1,303,895.

Patented May 20, 1919.
9 SHEETS—SHEET 9.

Witnesses
Arthur N. Parker
Robert Freer

Inventor
Nestor Headland
By Hier & Hier
Attys

UNITED STATES PATENT OFFICE.

NESTOR HEADLAND, OF CHICAGO, ILLINOIS.

MACHINE FOR PASTING, TRIMMING, AND FOLDING WALL-PAPER.

1,303,895. Specification of Letters Patent. Patented May 20, 1919.

Application filed January 16, 1917. Serial No. 142,668.

*To all whom it may concern:*

Be it known that I, NESTOR HEADLAND, a citizen of the United States, residing at Chicago, in the county of Cook and State of Illinois, have invented certain new and useful Improvements in Machines for Pasting, Trimming, and Folding Wall-Paper, of which the following is a description.

My invention belongs to that general class of devices intended to prepare paper or the like for certain purposes. It more especially relates to a device for handling wall paper, particularly for evenly applying and distributing the desired amount of paste to the wall paper and for trimming and cutting the same as desired, indicating the length of paper prepared and folding and piling the same in such manner that it may be easily and satisfactorily handled and applied to the walls or ceiling. The invention is in the nature of an improvement on the machine illustrated and described in my United States Letters Patent No. 1,154,015.

The invention has among its objects the production of a device of the kind described that is simple, convenient, compact, durable, efficient, and satisfactory, that may be used wherever found applicable. It has as a further object the production of a device that may be easily and conveniently transported or carried where desired. It has as its particular object the production of a machine that will handle all kinds and various sizes of wall paper; that will not injure the paper, either by wrinkling, creasing or smearing the paste upon the front of the same, and a machine in which the paper may be fed into the machine from the roll and taken out perfectly pasted, trimmed and ready for application to the wall. Many other objects, advantages and novel features will be obvious to those skilled in the art from the disclosure herein given.

To this end my invention consists in the novel construction, arrangement and combination of parts herein shown and described, and particularly pointed out in the claims.

In the drawings, wherein like reference characters indicate like or corresponding parts, Figure 1 is a side elevation of my complete machine set up ready for use;

Fig. 2 is a view in elevation of a modified form of roll;

Fig. 3 is a sectional view taken substantially on line 3—3 of Fig. 9;

Fig. 4 is a view of the opposite side of the same;

Fig. 5 is a view in elevation of the rod 29;

Fig. 10 is a rear elevation of a portion of the machine;

Fig. 11 is a view in elevation, illustrating in detail the leg fasteners assembled;

Fig. 12 is a sectional view substantially on line 12, 12 of Fig. 11;

Fig. 13 is a sectional view taken substantially on line 13, 13 of Fig. 11;

Fig. 14 is a view in elevation, illustrating the locking device for the frame 58;

Fig. 15 is a sectional view taken substantially on line 15, 15 of Fig. 14;

Fig. 16 is a sectional view through the machine, taken substantially on line 16, 16 of Fig. 8;

Fig. 17 is a sectional view taken substantially on line 17, 17 of Fig. 6;

Fig. 18 is a sectional view taken substantially on line 18, 18 of Fig. 16, with parts removed;

Figure 6:
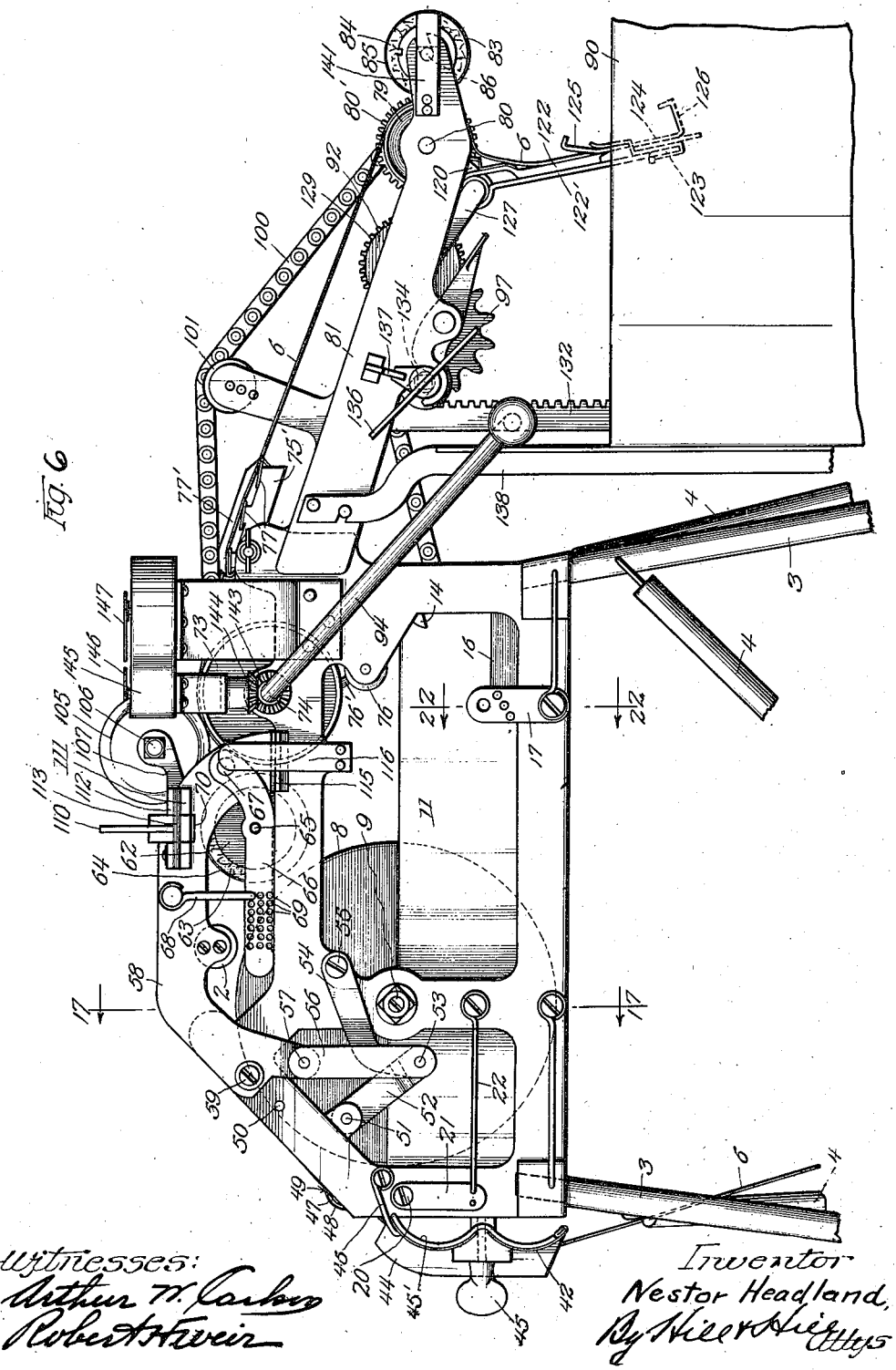
Fig. 6 is a side elevation of the upper part of the machine and similar to Fig. 1.

Before describing my machine in detail it may be mentioned that the same is particularly intended for the preparation of wall paper, and is arranged to carry a roll of paper, feed the same through the machine, treat and apply the paste to the paper, trim it and deposit it into a suitable receptacle, so that it may be taken by the decorator or paper hanger and applied to the walls.

Referring to the drawings, my machine preferably consists of a frame consisting of the end parts 1 connected and secured together by the cross-bars or pieces 2. The same is also shown provided with legs 3, which are preferably made detachable, so that the same may be removed as desired for transporting or storage. I also employ braces and connecting parts 4, 5 and 5', which may be secured to the legs in the manner hereafter described. In some cases the legs may not be desired, in which case they may be dispensed with and the frame and paper roll be otherwise supported to suit the preference of the user of the machine.

In describing the machine, I shall start with the support for the roll of paper and follow through the various parts that act upon the paper until its deposit in the receptacle for receiving the pasted paper. It may be first assumed that the paper as it comes in the roll is to be rerolled so as to bring the inner end out, this being sometimes desirable. It may be stated (see Fig. 1) that 6' represents the paper, which is rolled and as received from the manufacturer or dealer. To reverse the same and bring the other or inner end out, a rod 27 is extended through the roll, and the rod and roll then supported by brackets 28 carried by the frame or brace members 5. I provide a rod 29, which is to receive the paper and act as a core for the re-rolled paper which is to be passed through the machine. The rod 29 is carried by the brackets 36, the same being clamped into place by the members 37. I also provide a handle or crank 38, by means of which the rod 29 may be turned in re-rolling the paper. Arranged on the rod 29 are end plates or disks forming flanges so as to guide the paper and roll or feed it evenly. One or both of the plates is constructed substantially as shown in Figs. 3 and 4, in which 31 represents a plate or disk, preferably slotted as at 32, which carries locking members 33 and 34, 34 being pivotally secured at 35. When the member 34 is turned back the disk may be placed upon the rod 29, and then part 34 turned back and locked. It will be noted that the rod 29 (see Fig. 5) is notched, the number of notches and arrangement being as preferred. The purpose of the notches is to engage with the disk retaining members 33 and 34, and prevent the disk from sliding lengthwise the rod while in use, and indicate settings to correspond with the leader hereafter described. While the two disks employed, one at each end of the roll, may be similar, I ordinarily provide one constructed as a plain disk and secure the same to a rod by a set screw or the like (not shown in detail). However, both may be similar and as shown in Figs. 3 and 4. In rolling the paper 6' on to the rod 29, the extreme end is turned around and the rod 30 is inserted, the same being retained in place by the slots 32 and the paper, the roll being turned so that the paper passes over rod 30. The auxiliary rod 30 may be inserted or positioned without removing the disks. This locks the paper to the core 29, and prevents its rolling or the rod 29 turning without the paper. The crank 38 may now be turned until all the paper is reeled off of the rod 27 and the inner end brought out. The end 6 may then be passed through the machine, as will be hereafter described. In case the proper end of the paper is out on the original roll it is unnecessary to proceed as just described, as in that case the roll may be mounted on the rod 29 by removing one of the disks, and sliding the same along the rod, then replacing the disk and locking it at the desired point. To prevent the roll from spinning or unwindng too rapidly, I preferably provide a brake consisting of the resilient part 39 secured to a bracket 40, which may be secured to the machine, or their equivalents for the purpose.

Mounted on the machine frame is what I term a leader 42, which is preferably of the shape shown, and formed with slots 43 therein. The leader 42 is provided with side guides 44, which may be locked in the desired place by the thumb screws 45, the same engaging the coöperating part 45' on the back of the leader 42. The leader may also be graduated at one or both sides to indicate certain setting points of the side guides 44, as most clearly indicated in Fig. 10. The notches on the rod 29, as previously mentioned, correspond with the graduations on the leader, so that the disk or flanges on rod 29 and the side guides 44, particularly at one side, may be set to correspond. Ordinarily it is enough to provide indications at only one side of the machine, as the other side is set to correspond with the paper edge. The preceding description covers the guiding mechanism or system for guiding and feeding the paper to the paste roll. The leader 42 may be secured in place in any desired manner. As most clearly shown in Figs. 6 and 7, I provide supporting hooks 46 for the purpose, these being carried by the frame 1 and arranged to hook into the leader at each side and detachably secure the same in place.

Arranged between the ends 1 and carried by the frame, is a paste tank or receptacle 11, within which the paste-applying roll 8 projects. The paste roll 8 is carried by a shaft 9, as shown in detail in Fig. 17. The roll may be of any suitable material, aluminum having been found very satisfactory for the purpose. Where so constructed I have ordinarily reinforced the same by the spiders 8', or the equivalents for the purpose. The paste roll 8 is preferably rigidly secured to the shaft 9, so that the same may be driven as hereafter described, 10—10 being collars or bushings, which prevent movement of the paste roll lengthwise so that it at all times runs true.

Figure 22:
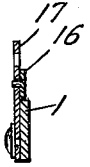
Fig. 22 is a section taken substantially on line 22—22 of Fig. 6.

The paste receptacle 11, constructed of suitable material, is in the form of a pan or vessel of suitable size and shape, which may be supported within the frames in any desired manner. In the preferred construction I provide lugs or pins 12 at each end of the paste vessel, which are arranged to detachably engage the supporting members 14 and 19 carried by the end parts 1 of the frame. The supporting members 14 are pivotally secured at 15 to the frame (see Fig. 6) the same being extended at 16 to form a bell-crank. The free end of 16 is arranged with a lug or pin, or equivalent means, adapted to engage in the desired hole in the member 17 (see Fig. 22). Obviously, adjusting the bell-crank by raising or lowering the free end of the part 16 varies the position of the upper end of arm 14, and affords a different adjustment of the paste receptacle. The opposite side of the paste receptacle is supported by means of the supporting members 19, arranged to engage the lugs 12 at that side of the same, one at each end, member 19 being carried by the pivot pin 20, which also carries an arm 21. (See Figs. 6 and 16). The members 21 are locked in the desired position by means of the hooked members 22, arranged to engage in the desired hole at the end of member 21, or by equivalent means for the purpose. It will be noted by referring to Fig. 16, as well as Fig. 17, that I provide wipers or paste removers at the ends of roll 8. For the purpose I have shown wipers 26 of felt, which are secured to the receptacle 11, and which wipe the paste at each end of the roll and prevent the same accumulating thereon.

Arranged adjacent the paste roll 8, between the paste roll and the leader 42, is a presser and feeder roll 47, which may be formed of suitable material. The same is shown being provided with a face 48 of suitable material. Ordinarily I have used sandpaper or emery cloth as a covering for roll 47. The presser roll 47 is suitably mounted on a frame 49, which is pivotally secured at 50 to the main frame of the machine. The frame 49 is arranged to be automatically raised in the manner hereinafter described, to permit the application of the paper to the machine. As shown, the same is connected by a link 52, pivotally secured thereto at 51 to links 54 and 56, which are pivotally secured at 53 to the link 52. The link 54 is pivotally secured at 55 to the main frame of the machine, and link 56 has its other end pivotally secured at 57 to frame 58, which is pivotally secured to the main frame at 59. The frame 58 is arranged to carry a regulator or drawer roll 62 and trimmers 105, as will be hereafter described.

Arranged between the roll 62 and the roll 47 is a paper scraper and softener 61. It will be noted by referring particularly to Fig. 16, as well as Fig. 8, that the scraper 61 is arranged spaced from the paste roll 8, and that after the paper contacts with the roll or adjacent roll 47, the same passes over the scraper 61 and is softened, then again contacts with roll 8, after which it is engaged by the regulator and drawer roll 62. The scraper is either preferably roughened lengthwise on its upper face, or provided with a detachable face, as shown, and the same tends to smear and cause the paper, which is somewhat softened by the paste applied by the roll, to better receive the paste, which is again applied after the same passes the scraper. By making the face of the scraper or softener detachable, the faces of any suitable material in various degrees of roughness may be applied, making the same most efficient for different grades of paper, as for example, thick or thin, or otherwise varied.

The roll 62 is provided with a cushion cover 63 of felt, rubber, or other suitable material, which is preferably covered with a covering 64 of sandpaper, emery cloth, or other material suitable for the purpose. The roll 62 is mounted on a shaft 65, which is carried by the frame members 66 (see Figs. 6, 7 and 19), these being pivotally secured at 67 to the frame parts 68, as shown in the figures referred to. The members 66 are formed with holes 69 arranged to coöperate and engage a suitable hook 68 at each side, so as to afford adjustments for the roll 62. The roll is driven in a manner hereafter described.

Figure 19:
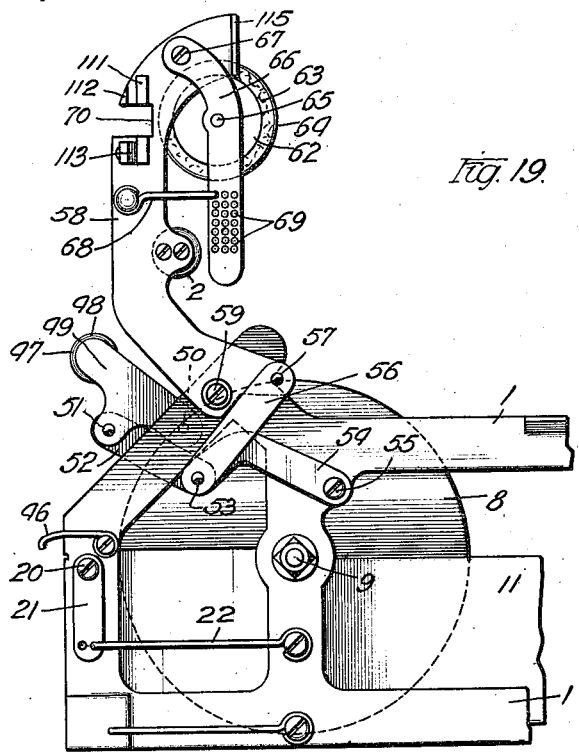
Fig. 19 is a side elevation of a portion of the machine similar to Fig. 6, illustrating the raising of part 58 and its associated parts in applying the paper to the machine.

As previously mentioned, the frame 58 also carries the cutters 105, and referring to Fig. 19, frame 58 is shown with a notch part arranged to coöperate with a cutter part, as will be hereafter described.

Carried by the main frame is a shaft 74, which carries the cutter roll 73 arranged to coöperate with the cutters 105. The cutter roll 73 is of any suitable material, preferably of material that will not be cut or distorted by the cutters 105.

It will be noted, referring to Fig. 16, that I provide a member 76 carried by the main frame 1 below the cutter roll 73. Member 76 carries a wiper 76' of suitable material, which is arranged to wipe the cutter roll and prevent the paste from accumulating thereon. After leaving the cutter roll 73, the paper travels over the part consisting of cross-bars 77 carried by the main frame, the purpose of these being to level or smooth the paste on the paper, so that it is in perfect condition for applying to the walls. Carried by cross frame 2 (see Figs. 9 and 16) are members 78 adapted to engage the edge trimmings 6² and prevent them following or clinging to the roll 73. The main part or body of the paper 6 is removed from the roll by the fingers 75 carried by part 75'. Guides 77' are also preferably provided.

Figure 7:
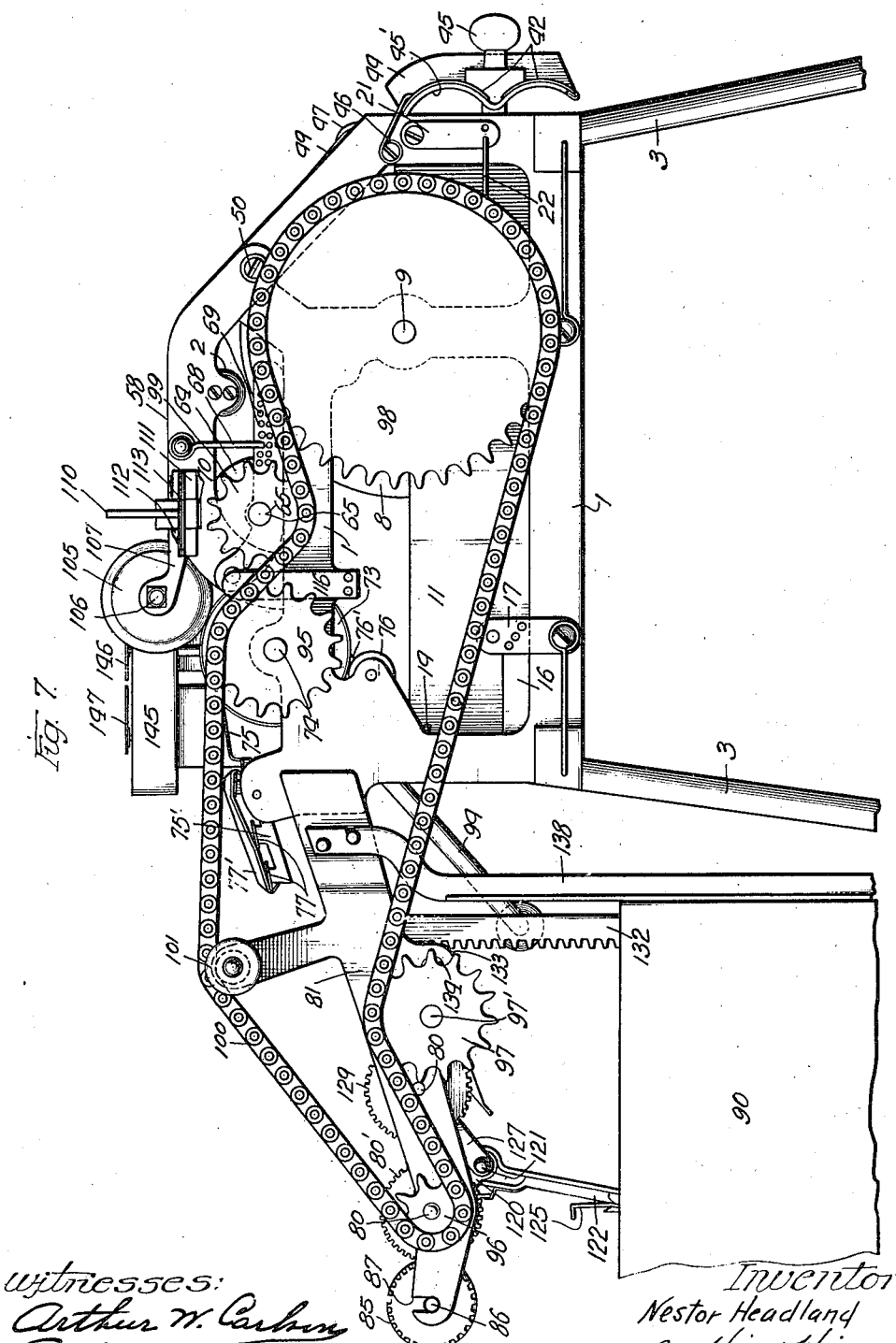
Fig. 7 is a similar view of the opposite side or end of the machine.
Figure 8:
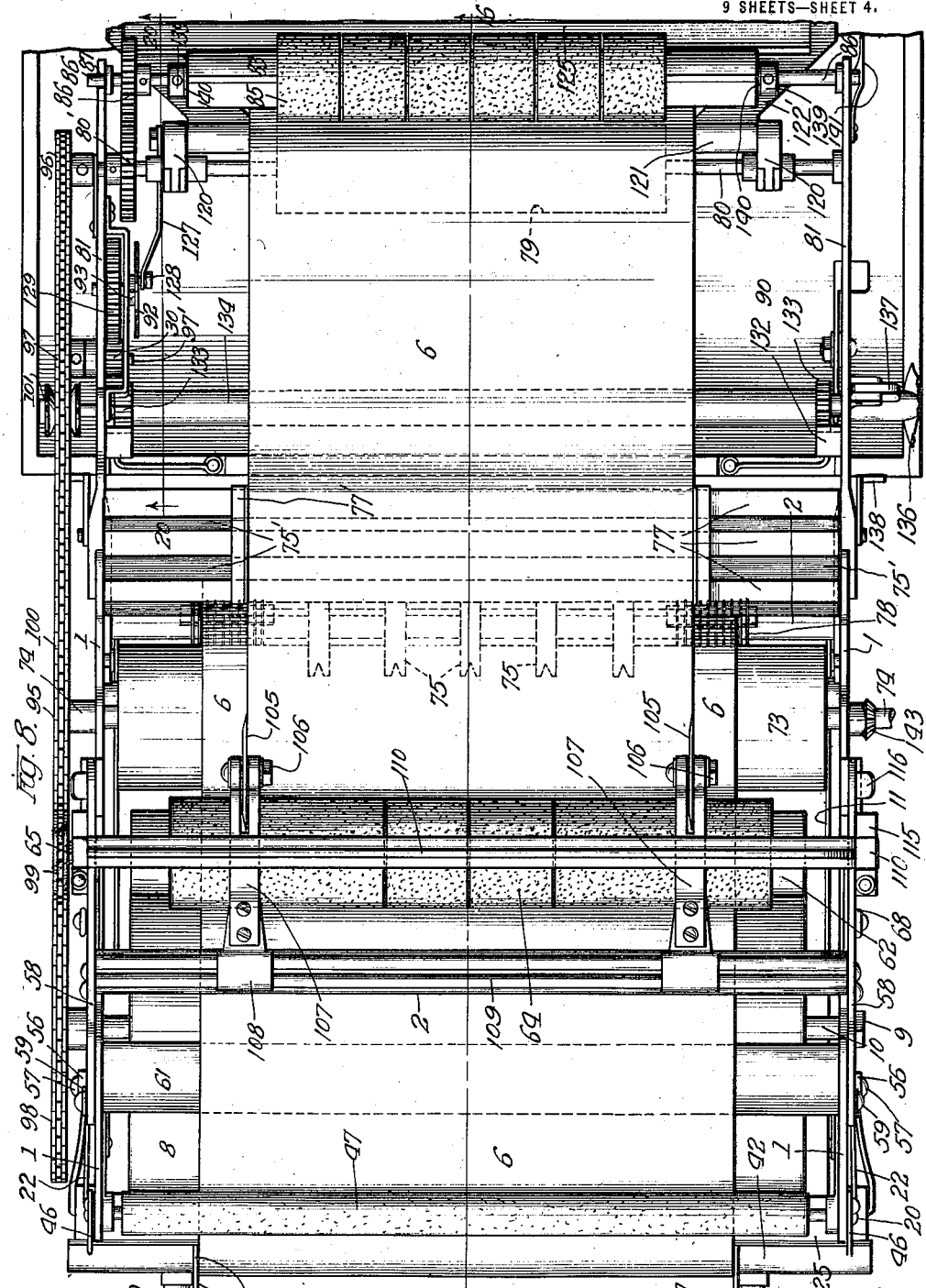
Fig. 8 is a plan view of the machine.

As clearly shown in Figs. 6, 7 and 16, I provide an extension frame including the side bars 81. These are preferably detachably carried by the main frame, and in the construction shown (see Fig. 16) the same are arranged to rest upon cross-bar 2 of the main frame and engage with lugs 82, or the equivalent, so that the same may be easily slipped into or out of place. The extension frame carries a roll 79 mounted on shaft 80, and a roll 83 mounted on shaft 86. The roll 79 is preferably provided with a cover or smooth outer face of suitable material, preferably metal or the like. The roll 79 is preferably shorter than the width of the paper, so as not to press out the paste at each side. As most clearly shown in Fig. 16, I also provide spring or yielding fingers 119, which remove the paper from the roll and prevent its following the same around with the roll. The roll 83 is provided with a cover of suitable material, as for example, felt, cork, rubber, or the like, and with an outer covering 85. Roll 83, it may be mentioned, is preferably made in a plurality of sections or slices, as illustrated in Fig. 8, so that the same may be made of a length of suitable paper. It may be mentioned that the shaft 86 may be maintained in place by the recessed cap at one end, which is secured to the extension frame (not shown), the frame being slotted at 87 so that the shaft may be dropped into place at the end. The opposite end, however, is preferably locked in place by a locking member 141 (see Figs. 6 and 8). I shall refer to this roll again hereafter. One side frame 81 carries a member 92 (see Fig. 20) mounted on a shaft or spindle 93, the purpose of this being more fully described hereafter. It will be noted by referring to Figs. 7 and 20, that mounted upon shaft 80 and 86 are meshing gears 80' and 86'.

The trimming mechanism is most clearly shown in Figs. 6, 14, 15 and 16, particularly the last mentioned figure. In the first place it may be mentioned that there may be any number of trimming cutters. These are so arranged that they may be adjusted above along the cutter roll 73, and also so that the tension may be varied. For this I preferably provide rotary cutters 105, mounted on shaft 106 carried by the members 107, which are yieldingly secured by the clips 108 to the bar 109, extending across ᴜne machine. The same are maintained in contact with the cutter roll 73 by a pressure or cross-bar 110. (See Figs. 10 and 16.) It is so arranged that it extends across above the parts 107, and the same is adjustably carried by the adjustable frame 58. As most clearly shown in Figs. 14 and 15, I provide lugs 111 and 112 at each side of the slot 70 on the frame 58, and extend shims 113 across the same below lugs 112. The bar 110 is clamped in place and the pressure of the cutters varied by adding or removing shims 113. The method of locking the frame 58 in operative position is shown in Figs. 14 and 15, in which 116 is a spring catch, one being on each side, provided with an extension 117 arranged to engage the lug or offset 115 on the adjustable frame 58.

Figure 9:
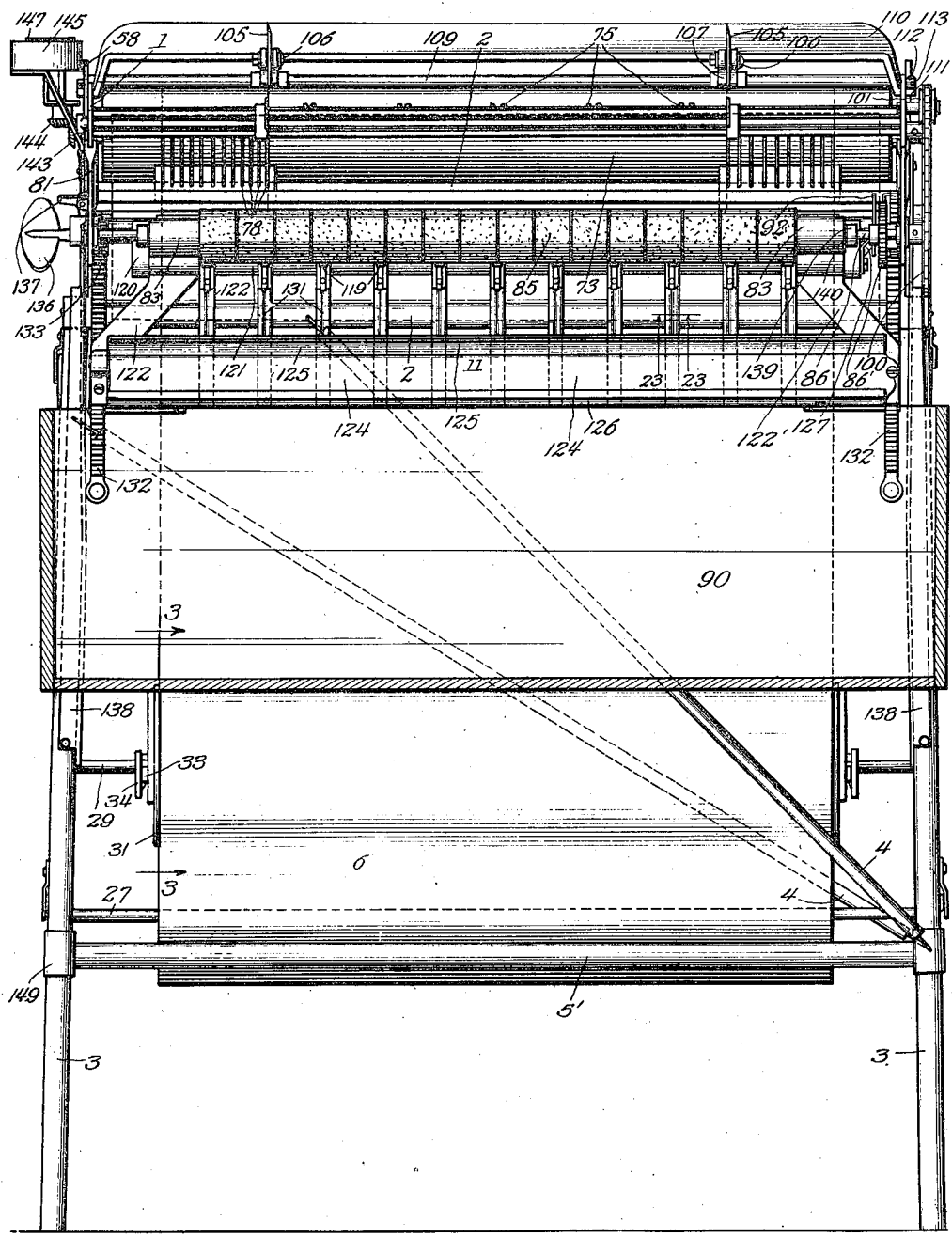
Fig. 9 is a front elevation of the machine, a portion in section.
Figure 23:
Fig. 23 is a sectional view taken substantially on line 23—23 of Fig. 9.
Figure 20:
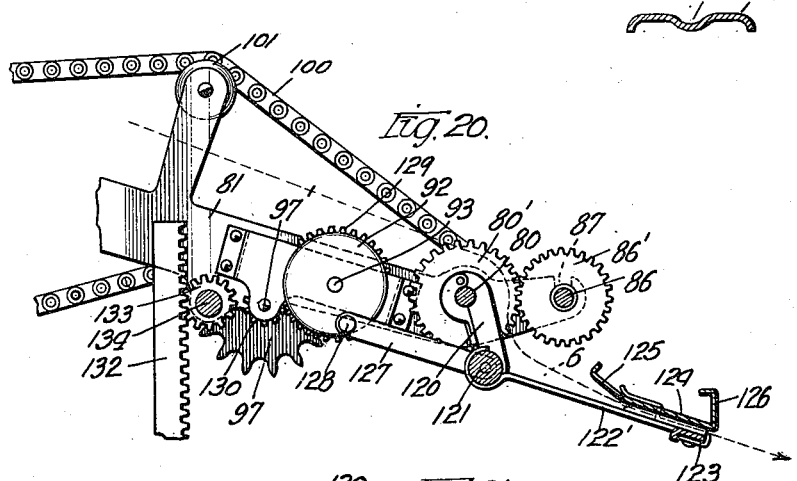
Fig. 20 is substantially a sectional view taken on line 20, 20 of Fig. 8, illustrating the folding mechanism.
Figure 21:
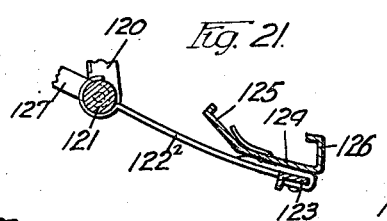
Fig. 21 is a view of a modification similar to a portion of the folding mechanism shown in Fig. 20.

Referring to Figs. 16 and 20, as well as Fig. 8, shaft 80 loosely carries an arm 120 at each side. This carries a bar 121, which extends across the machine. The bar 121 carries the arms 122 and part 122', which are connected with a bar 123. Above the bar 123 is a bar 124, preferably turned up at 125 at one edge, and as at 126 at the outer edge. There is a space between the bar 123 and bar 124, as most clearly shown in Fig. 20. It may be mentioned that I preferably form the members 122 as indicated in Figs. 9, 20 and 23, with a groove 131, or its reverse, to-wit, a bead, which will form tracks in the paste on the paper and tends to cause the paper to move in a straight line down the members 122, which are substantially skids. The bar 121 is rocked as well as partially rotated by a link 127 (see Fig. 20) which is pivotally secured by a pin 128, or equivalent means, to the rotatable member 92. Obviously, as member 92 is rotated, the arm or link 127 rocks the bar 121, which is carried by the arms 120 mounted on shaft 80, and have substantially the same effect as if the bar 121 was partially rotated. This causes the fingers or skids 122 to rock, for example, see Figs. 6, 7 and 20. A modified construction is shown in Fig. 21, in which the parts are slightly curved, for example, 122², which corresponds with the parts 122'. The member 92 is driven by means of a gear 129 in mesh with the pinion 130, which is in turn driven by the shaft 97' and sprocket wheel 97.

Referring particularly to Figs. 6, 7 and 16, it may be mentioned that shaft 74 is the main driving shaft to the machine. It is provided with a crank 94 (Fig. 6) or equivalent means for driving the same. At the opposite end of the shaft 74 I provide a sprocket 95. I also provide a sprocket 96 on shaft 80, sprocket 97 on shaft 97', and the sprocket 98 on shaft 9. Shaft 65 is also provided with a sprocket 99. The several sprocket wheels mentioned are driven from shaft 74, and sprocket 95, by means of a sprocket chain 100, preferably arranged as shown (see Fig. 7). I also provide an idler or tensioning wheel 101. Obviously, as the crank 94 is turned the several sprockets and shafts are driven in the directions indicated, and shaft 86 is driven through the intermeshing gears 80' and 86.

Referring to Figs. 6, 7, 16 and 20, it will be noted that the paper receptacle or box 90 is provided with a rack 132 at each side, which is secured to the receptacle at its lower end, and at its upper end engages with a pinion 133, secured to shaft 134. Shaft 134 is operable by a crank 136, or its equivalent, (see Fig. 6) a lock screw 137 being provided for locking the shaft against rotation, as desired. It will be noted, referring to Figs. 1 and 6, that the receptacle slidably engages with or against the guides 138 at each side, which may be adjustably or detachably mounted upon the bars 81 in any desired manner. Obviously, turning shaft 134 will cause the receptacle 90 to be raised or lowered as desired. It may be mentioned (see Fig. 1) that the receptacle is preferably provided with one side 90' hinged at 90², so that the same may be dropped. Any suitable form of catches may be employed to lock the same shut at such times as may be desired.

In order to indicate the amount or length of paper passed through the machine, I show an indicator, which is driven from the main shaft 74. In the construction shown 143 is a pinion, which meshes with a pinion 144, which drives a shaft (not shown) arranged to actuate suitable recording or indicating mechanism in case 145, 146 and 147 being the indicators or indicating the inches and feet respectively. I have not considered it necessary to describe the indicating mechanism in detail, as any suitable mechanism may be employed for the purpose.

As was previously mentioned, the roll 83 is provided with sectional parts or slices 84 covered by a suitable covering 85. The roll 83 is maintained in the desired position on the shaft 86 by the collars 139, between which and the shoulders there are felt washers 140, or the equivalent. In Fig. 2 I show a modified form of slice 4, in which 153 is a body part of rubber or similar material, having a bore arranged to slide on the roll 83, and provided with flanges 154 of cork or similar material. The reason why the roll 83 is made in slices instead of one cylinder, is that any point on this roll must be available to engage the paper, with a portion spaced therefrom. This permits the spacing to correspond with the seams when cutters are put on to split the paper to one or more strips. Should there be pressure on a point where the same is cut the paste would work through and smear the front of the paper. The slices are ordinarily most satisfactory when the flanges are of sponge rubber, and one at each end of a cork or wood body.

I have not considered it necessary to illustrate in detail all of the various little features which contribute to the success and convenience of my machine, but I have illustrated in Figs. 11, 12 and 13 a simple construction for securing the legs together at the braces 5 and 5'. Referring to these figures, the parts 5 are formed with clamps 149 extended as at 150, which will wrap around and embrace the legs 3. The braces 5' are formed with members 151, formed as most clearly shown in Fig. 13, which may be slipped over 149—150 and secure the various parts together in a simple manner.

The operation of the machine may be briefly described as follows: If the paper is to be re-rolled before running through the machine the same is mounted on the rod 27 and the same is then rolled on to rod 29. If it is not desired to re-roll the same, it may be placed directly on rod 29, and the outer end is brought up and over the leader 42, the guides 44 being set to correspond with the flanges 31, so that the paper will run true or straight through the machine. The frame 58 is tipped up, as shown in Fig. 19, carrying with it the cutters and roll 62, as well as the presser roll 47. The paper then may be easily inserted under the presser roll and brought up over the scraper or softener 61, thence over the roll 73, and the end of the paper is then brought over roll 79 between that roll and the roll 83, as shown in Fig. 16, and down between the parts 122 and 124, with the end projecting therefrom. The receptacle 90 is adjusted to the desired position and locked. The frame 58 and roll 62—47 and the cutters 105 are locked into place. If not adjusted the receptacle 11 may then be adjusted as desired, and so as to bring the wiper at 25 in the desired relation to the paste roll 8. If the crank 94 is now turned this will rotate shaft 74, and through the intermediate mechanism will rotate the paste roll 8, roll 62, roll 73, roll 79, roll 83, as well as rock bar 121, carrying the fingers 112 or folding apparatus. The trimmings 6² severed by the cutters 105 will be removed from the roller 73 by fingers 78. As the paper travels over the course mentioned it will be guided by the leader 42 and flanges 44, as previously mentioned, and will be pressed against the paste roll by the roll 47, the paper being partially softened by the paste applied, then travels over the paper scraper or softener 61. The rubbing of the bar 61, or its equivalent, against the paper rubs the paste into the paper and softens it. The roughness of the bar or its cover may be as desired, this depending upon the particular paper and other circumstances, as for example among them the condition of the paste, and possibly the kind of paste used. It will be particularly noted that the bar 61, which is carried by the main frame, and to all intents and purposes is a part thereof, is arranged so that the paper, after first passing over the roll again, passes over the paste roll, and again has paste applied thereto. After leaving the paste roll the second time the same passes over the regulator and drawing roll 62, thence on to the cutting roll 73. The regulator or drawing roll is preferably made in sections, as most clearly shown in Fig. 8, so that its length may be varied, and is so positioned that it does not actually come into contact with either the paste roll or the cutter roll, so that it does not take up any of the paste and become soiled. By providing the same with a covering or face 64 of emery cloth or sandpaper, or like material, the roll takes a firm hold of the paper and draws the same from the scraper over the paste roll without slipping. The face may also be replaced from time to time as may be required. The object of mounting the roll 62 on a frame as described is obvious, this mounting permitting the easy application or insertion of the paper into the machine, the same in the preferred construction being so arranged that the roll 47 is also moved out of operative position. The roll may be further adjusted relative the other rolls by means of the connecting bar 68, as heretofore described. The pressure of the cutters on the cutting roll may be varied by slipping through the desired shim or plate 113, and the cutters may be shifted along the bar to the desired points. The rubber or other yieldable cushion between the cutter carrier 107 of the bar 110 improves the cutting, and in case of any wear at any point on the cutter roll or cutter, substantially causes the same to coöperate at all points during the operation of the machine. The bars or faces 77 level and smooth the paste on the pasted side of the paper, and tend to draw back to the edges of the paper any paste that the cutters had pressed inwardly. The fingers 75, of course, lift the paper off of the cutter roll 73, and 78 remove the trimmings 6², as previously mentioned. It may be mentioned that by making the fingers 78 of thin wire, as shown, the paper easily runs over them, as there is practically no friction.

The rolls 79 and 83 draw the paper over the paste leveler and smoother 77, and thereafter push it through the folding mechanism into the box. They are preferably arranged so that they travel slightly faster than the paper through the machine. The roll 79 is preferably slightly shorter than the width of the paper so as to avoid picking up the paste near the edge of the paper. The paper is evenly distributed or folded in the box by the folding carrier. It is made so that there may be as little friction as possible when the paper passes over the fingers 122, and they are preferably made with either a groove 131 or a bead in the opposite direction, so that this also tends to keep the paper running straight and preventing its moving to the right or left. As the paper carrier rocks back and forth it folds the paper in the receptacle 90 substantially as indicated in the dotted lines in Fig. 1.

The receptacle or box 90 not only forms a convenient receiver for the trimmed and pasted paper, preventing its falling on the floor, but the same also causes the paper to be evenly folded and prevents the paste from drying too fast. By making the same vertically adjustable it may be lowered, as the same is filled, and the paper is likewise more efficiently folded.

The object of making the roll 83 as shown and constructing it so that it may be yieldingly held on the shaft 86 is that it tends to travel with the same speed as the paper, thereby preventing the figured side of the paper from being scratched or injured.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:—

1. In a device of the kind described and in combination, a suitable frame, a paste receptacle, a paste roll arranged to project into said receptacle, a paper carrier, means for leading the paper to said paste roll, a presser roll arranged in proximity to said paste roll, a paper softener arranged adjacent said paste roll, a cutter roll, a drawing roll arranged between said cutter roll and paste roll, cutters arranged to coöperate with said cutter roll, a paste smoother, folding mechanism, and means for drawing the paper over the paste smoother and pushing the same through the folding mechanism.

2. In a device of the kind described and in combination, a suitable frame, a paste receptacle, a paste roll arranged to project into said receptacle, means for removing the surplus paste therefrom, a paper carrier, an auxiliary paper carrier, means for leading the paper to said paste roll, a presser roll arranged in proximity to said paste roll, a paper softener arranged adjacent said paste roll, a cutter roll, means for removing the paste therefrom, a drawing roll arranged between said cutter roll and paste roll, cutters arranged to coöperate with said cutter roll, a paste smoother, folding mechanism, and means for drawing the paper over the paste smoother and pushing the same through the folding mechanism.

3. In an apparatus for coating a web of material, the combination with a cylinder, of means for applying coating material to the surface of said cylinder, means for bringing the web to be coated into contact with the surface of said cylinder at a point on said surface to enable the coating material to be applied directly to the web by the cylinder, means for then leading the web out of contact with the cylinder, and means for thereafter again bringing it against the cylinder surface.

4. In an apparatus for coating a web of material, the combination with a cylinder, of means for applying coating material to the surface of said cylinder, means for bringing the web to be coated into contact with the surface of said cylinder at a point on said surface to enable the coating material to be applied directly to the web by the cylinder, means for then leading the web out of contact with the cylinder and for leveling the coating on the web, and means for thereafter again bringing it against the cylinder surface.

5. In a machine of the kind described and in combination, a paste roll, means for applying paste to said roll, and means arranged adjacent said roll for raising the paper from the roll intermediate its extreme points of contact with the roll, said means provided with an abrasing face arranged to contact with the pasted side of the paper.

6. In a machine of the kind described and in combination, a paste roll, means for applying paste to said roll, and means arranged adjacent said roll for raising the paper from the roll intermediate its extreme points of contact with the roll, said means provided with a detachable abrasing face part arranged to contact with the pasted side of the paper.

7. In a machine of the kind described and in combination, a paste roll, means for feeding the paper to the paste roll, means for applying paste to said roll, and means arranged adjacent said roll for raising the paper from the roll intermediate its extreme points of contact with the roll, said means provided with an abrasing face arranged to contact with the pasted side of the paper, and means for securing the pasted paper.

8. In a wall paper pasting machine and in combination, a paste applying member, means for supplying paste to said member and a paper softener comprising a bar arranged to engage with the pasted face of the paper, the paper contacting with the paste applier at a plurality of points with said softener intermediate said points, whereby the partially pasted paper is softened and thence re-pasted.

9. In a wall paper pasting machine and in combination, a paste applying member, means for supplying paste to said member and a paper softener comprising a bar having a detachable face arranged to engage with the pasted face of the paper, the paper contacting with the paste applier at a plurality of points with said softener intermediate said points, whereby the partially pasted paper is softened and thence re-pasted.

10. In a device of the kind described and in combination, a suitable frame, a paste receptacle, a paste roll arranged to project into said receptacle, a paper carrier, means for leading the paper to said paste roll, a presser roll arranged in proximity to the paste roll, and means for drawing the paper over said paste roll, comprising a roll body, a shaft for supporting said body, a cover for said body, said cover constructed in a plurality of sections and having a face arranged to frictionally engage the paper.

11. In a machine of the kind described and in combination, a paste roll, means for applying paste thereto, a paper carrier provided with guides at each end, a leader bar arranged to direct the paper to said paste roll, said leader bar provided with guides at each end, means for fastening said guides to said leader bar and notched means on said carrier and said leader bar for properly adjusting the guides relative the direction of the paper.

12. In a machine of the kind described and in combination, a paste applier, means for applying paste to said applier, means for carrying paper to said applier, a presser roll arranged to press the paper on the paste roll, means for supporting said presser roll, a drawer roll arranged to draw the paper from said paste roll, a cutter roll and cutter arranged to coöperate therewith, said drawer roll adjustably relative to said paste roll and said cutter roll and means for drawing the paper from said cutter roll.

13. In a paper pasting and preparing machine of the kind described and in combination, a paste applier, means of drawing the paper from said applier, a cutter roll and cutters arranged to cut the edges of the paper, a paste smoother comprising a bar arranged to contact the pasted face of the paper and carrying means at each end for pressing against the edges of the paper and preventing the paste from rising up to the right side of the paper.

14. In a paper pasting and preparing machine of the kind described and in combination, a paste applier, means of feeding the paper to said applier, a trimming mechanism, means for leveling and smoothing the paste on the paper subsequent to the application thereto and trimming thereof comprising a plurality of bars extending across the path of the paper on the pasted side thereof, the adjustable means for protecting the right side of the paper and the means of drawing the paper from said smoother.

In testimony whereof I have hereunto signed my name in the presence of two subscribing witnesses.

NESTOR HEADLAND.

Witnesses:
 Roy W. Hill,
 Charles I. Cobb.